United States Patent [19]

Karpman et al.

[11] Patent Number: 5,657,165
[45] Date of Patent: Aug. 12, 1997

[54] APPARATUS AND METHOD FOR GENERATING FULL-COLOR IMAGES USING TWO LIGHT SOURCES

[75] Inventors: Maurice S. Karpman, Brookline; Allen Becker, Newton, both of Mass.

[73] Assignee: Reflection Technology, Inc., Waltham, Mass.

[21] Appl. No.: 540,871

[22] Filed: Oct. 11, 1995

[51] Int. Cl.$^6$ .................... G02B 27/14; G02B 26/08
[52] U.S. Cl. .................... 359/634; 359/212; 359/213; 359/214
[58] Field of Search .................... 359/634, 212, 359/213, 214, 215; 345/7, 8, 31, 82, 83

[56] References Cited

U.S. PATENT DOCUMENTS

| 4,457,580 | 7/1984 | Klose | 350/6.91 |
| 4,934,773 | 6/1990 | Becker | 359/214 |
| 5,325,386 | 6/1994 | Jewell | 372/50 |

FOREIGN PATENT DOCUMENTS

| 0 301 801 | 2/1989 | European Pat. Off. |
| 02 123 344 | 5/1990 | Japan . |
| 2790 | 1/1991 | Japan . |
| 66993 | 3/1992 | Japan . |
| 127113 | 5/1993 | Japan . |

OTHER PUBLICATIONS

Wells, Ben "A Miniature Virtual Display Implement", Optoelectronics, vol. 6, No. 1, pp. 155–162 (1991).

Primary Examiner—Georgia Y. Epps
Assistant Examiner—Ricky Mack
Attorney, Agent, or Firm—Lahive & Cockfield, LLP

[57] ABSTRACT

A miniature, full-color display includes two rows of light-emitting elements that are both selected to emit light in substantially non-overlapping wavelength ranges comprising a blue-green wavelength range and a red wavelength range. The light-emitting elements as well as a magnifying lens, and an oscillating mirror are placed in a light-tight box having an opening through which the mirror may be viewed. The light from the blue-green elements is filtered by a filter which transmits either blue or green light depending on the mirror movement. The light-emitting devices are selectively illuminated as the mirror moves to create a full-color, substantially planar, two-dimensional image. The light box may be sized to be hand-held, or may be capable of being mounted to a pair of glasses, a headband or similar device.

28 Claims, 4 Drawing Sheets

APPARATUS AND METHOD FOR GENERATING FULL-COLOR IMAGES USING TWO LIGHT SOURCES

FIELD OF THE INVENTION

This invention relates to display systems, and more particularly to full-color miniature display systems.

BACKGROUND OF THE INVENTION

Rapid advances in the field of solid state technology are continuously reducing the size of various electronic devices, including computers, video games, and calculators. The size to which such devices can be reduced nevertheless is limited by the size of the output display devices that are generally required to properly utilize these devices. This limitation has arisen primarily because the display devices must have sufficient resolution to display at least a full page of textual information. In order to achieve this resolution, commonly used display devices, such as cathode ray tubes and liquid-crystal displays, must be of sufficient size so that a user can adequately view several hundred thousand picture elements on the display device. Accordingly, it generally difficult and expensive to reduce the dimensions of such display devices to a significant degree without significantly sacrificing resolution.

There are times, however, when the use of a relatively large and heavy display device is inconvenient. Much smaller display devices have thus been designed to provide a visual display that is comparable in resolution to larger display devices known in the art. One such device is described in U.S. Pat. No. 4,934,773, to Becker, which discloses a miniature display device that can either be hand-held or mounted on a headstrap. When looking into the device, a user views a two-dimensional virtual image. The virtual image is created by a linear array of light-emitting diodes ("LEDs") which generates a line image. A two-dimensional virtual image is formed from the line image by reflecting the line image from an oscillating mirror to the user's eye. As the mirror oscillates, the line image is swept back and forth to generate a rectangular two-dimensional raster. By properly timing the "on" and "off" timing of the LEDs, an image is produced.

However, although the device can easily produce a monochrome image using single color LEDs in the linear array, there is some difficulty producing a full-color image (i.e. an image that includes at least the three additive primary colors red, blue and green). The Becker patent provides a solution to this problem by teaching a second embodiment that produces a full-color display. This display uses three LED arrays, which each require separate hardware and software for proper operation, and that respectively emit red, blue, and green beams of light.

The latter device has limitations. First, the overall size of the device is increased, however, because it must include at least the three LED arrays, as well as the hardware and software that accompanies those arrays. The desired miniaturization effect consequently is limited as the overall manufacturing cost of the device is increased.

Additional problems arise when three LED arrays are used to produce a full-color image. For example, it is known in the art that normal chromatic aberrations in a lens can tend to distort an image if the distance between at least two of the beams forming the image is relatively large (typically on the order of 1 mm) as they intersect the incident surface of the lens.

Further, it is also known in the art that any LED array in such a display system will typically have at least a 1 mm space on at least one side of it so that the array can be properly coupled to a connecting substrate. Consequently, any adjacent grouping of at least three LED arrays will necessarily have at least one array that is separated from the other arrays by at least 1 mm. Image distortion may therefore occur, which is a highly undesirable result in such systems.

One solution to the latter problems is to position the LED arrays in different physical locations and coincidentally re-align the beams with reflecting mirrors. Such a configuration nevertheless requires additional elements, again increasing the size and cost of the device.

Alternatively, it is possible to make a color display with only two additive primary colors using two single color LED arrays. The color gamut possible with only two primary colors, however, is extremely limited and such a display would not be suitable for various photorealistic applications such as CAMCORDER viewfinders or television displays. These color sensitive applications need a large color gamut that requires at least three additive primaries to achieve a large color gamut.

Other full-color miniature display devices utilize liquid crystal displays that function generally identically to the liquid crystal displays commonly used in larger scale full-color display devices. Such full-color miniature display devices typically have a large number of very closely spaced miniature pixels that are either red, green, or blue. The pixels are selectively lit to produce a full-color display. Such devices, however, tend to be relatively expensive and often require sophisticated hardware and software to drive them.

Accordingly, there is a need for a miniature display device that provides a full-color visual display, has a relatively low manufacturing cost, and is more compact than those related full-color display devices known in the art.

SUMMARY OF THE INVENTION

In accordance with the above, this invention provides a miniature full-color display system that utilizes only two separate arrays of light-emitting elements to produce full-color display pixels. In the illustrative embodiment, light-emitting elements in one of the arrays emit blue-green light, while light-emitting elements in the other array emit red light. The blue-green light from the first array is passed through a variable filter that filters out either green light or blue light to produce either blue light or green light, respectively. The second array may be positioned so that the red light is passed through a first imaging optics substantially coincidentally with the blue or green light transmitted through the filter, thus creating an enlarged virtual image of the two arrays. The enlarged virtual image is then reflected from an oscillating mirror that repetitively moves through a predetermined range of movement to produce a two-dimensional reflection of the enlarged virtual image. In response to controlling hardware and software, each of the individual light-emitting elements are selectively illuminated as the mirror moves to create a full-color, substantially planar, two-dimensional, enlarged virtual image. The first array, second array, first imaging optics, and mirror are positioned so that a user's eye can view substantially all of the virtual image without requiring the display system to be moved relative to the user's eye. The first imaging optics and mirror are sufficiently small enough for use in a hand-held and/or headgear-mounted device.

It is therefore among the objects of the invention to provide a miniature display device that provides a full-color display.

It is also an object of the invention to provide a full-color miniature display device that uses at most two arrays of light-emitting diodes.

It is another object of the invention to provide a full-color miniature display device that uses less hardware and software, and consequently is more compact than those similar LED-based full-color display devices known in the art. It is a further object of the invention to provide a low-cost full-color miniature display device.

DESCRIPTION OF THE DRAWINGS

The foregoing and other objects and advantages of the invention will be appreciated more fully from the following further description thereof, with reference to the accompanying drawings wherein.

DESCRIPTION OF THE ILLUSTRATIVE EMBODIMENT

Figure 1:
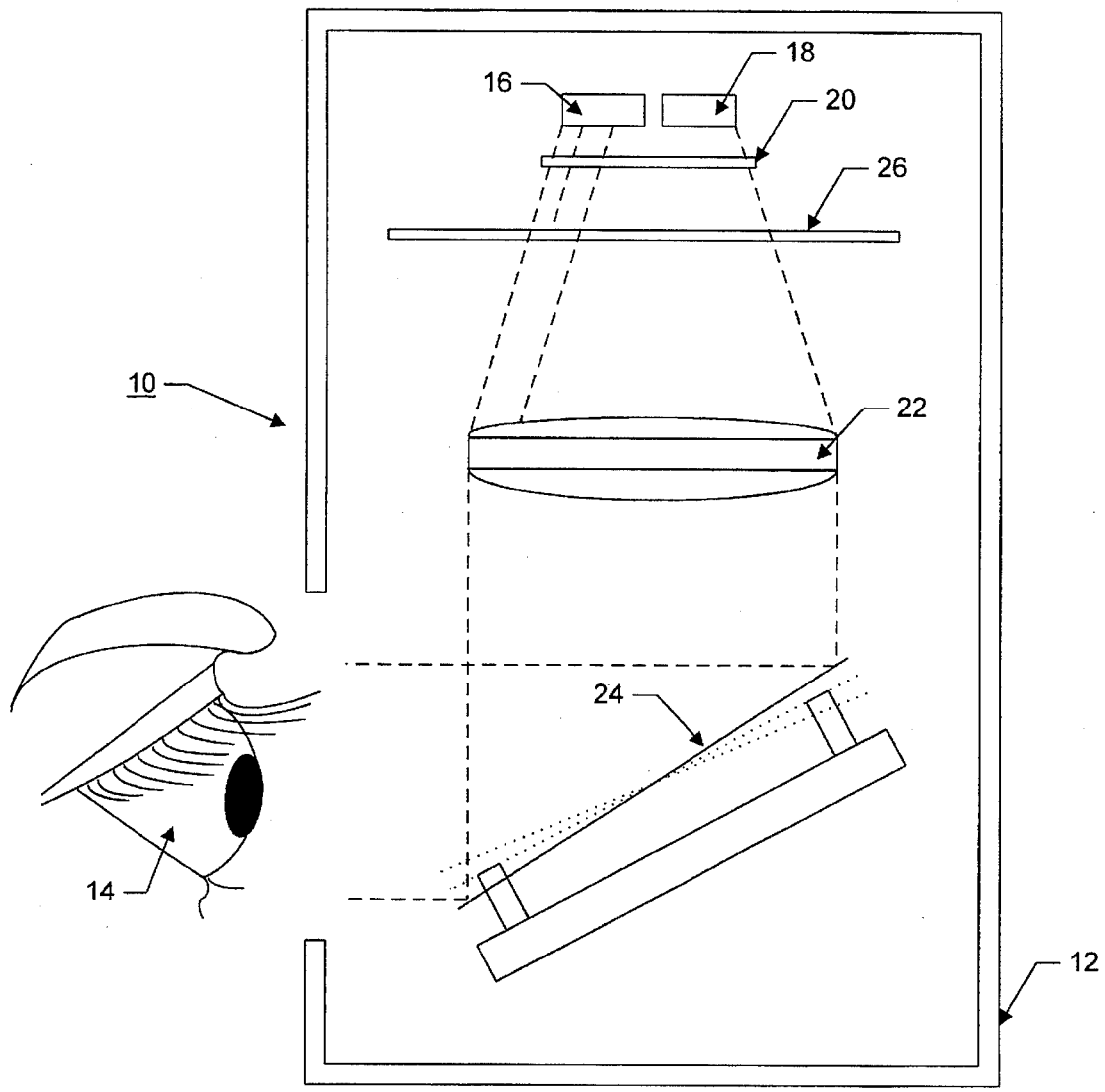
FIG. 1 is a schematic illustration of a preferred embodiment of the invention having two light-emitting-diode arrays that are positioned adjacent to one another.

FIG. 1 shows a cutaway view of a display system 10 that is packaged in a light-type box 12 having a single opening 14 formed therein through which an image can be viewed. The box 12 is designed to be very compact, typically having dimensions of about 1.0"×3.0"×1.2". The opening 14 can be a square hole, a round hole, a rectangular hole, or any other usefully shaped hole for viewing the image within the box 12.

The display system 10 includes a first array of light-emitting elements 16 and a second array of light-emitting elements 18. The two arrays 16 and 18 can each be made up of a plurality of light-emitting diodes ("LEDs"), where the first array emits light within a first predetermined wavelength range, and the second array emits light within a second predetermined wavelength range. For example, the first array 16 emits a light beam that is in the blue-green wavelength range (having a peak wavelength of approximately 490 nm to 510 nm and a spectral Full Width Half Maximum of 50 nm to 100 nm) and the second array 18 emits a light beam that is in the red wavelength range (having wavelengths of approximately 620 nm to 700 nm). A glass cover 20 may be positioned a short distance from the arrays 16 and 18 to protect them from any ambient dust particles or other contamination.

A variable light filter 26 is provided to alternately filter, in the preferred embodiment, either blue light or green light from the blue-green array 16. The filter 26, which is discussed in more detail below, is selected so that it filters out either blue light or green light while it permits light from all other wavelength ranges to fully pass through it.

The light beams emitted from the arrays 16 and 18 may be passed through imaging optics, which, in the preferred embodiment, is a simple magnifying lens 22. By way of example, a magnification lens having a diameter of 30 mm and a focal length of 15 mm should provide suitable results when used in the display system 10. It is known in the art that light beams passing through the lens 22 will be substantially collimated, as shown in FIG. 1, when the arrays 16 and 18 are positioned at, or near, the focal point of the lens 22. The lens 22 therefore creates an enlarged virtual image of both the first array 16 and the second array 18. The enlarged virtual image is then reflected from an oscillating mirror 24 that repetitively moves through a predetermined range of motion to produce a two-dimensional, full-color reflection of the enlarged virtual image.

By using appropriate controlling hardware and software, as detailed in the Becker patent (U.S. Pat. No. 4,934,773), the disclosure of which is hereby incorporated by reference, the oscillation of mirror 24 is coordinated with the lighting of the individual LEDs to create full-color graphic images that are distinctly visible to a user viewing the arrays 16 and 18 at the opening 14. Full-color images may be produced, for example, by controlling the filter 26 to first illuminate the mirror 24 with red light and green light each time the mirror oscillates in one direction, and then controlling the filter 26 to illuminate the mirror 24 with red light and blue light each time the mirror returns in the reverse direction. Since every individual frame of the output image is created by the combination of both the forward and reverse oscillations of the mirror 24, every frame of the output image should have at least each of the three primary colors (red, blue, and green) to therefore produce a full-color image.

In accordance with one embodiment, the filter is mechanically moved to change the wavelength selection of the light which illuminates the mirror 24. In this embodiment, hardware and software (not shown) is used to move the filter in synchronism with the oscillation of the mirror 24. Illustratively, the latter hardware and software can be similar to that used in the aforementioned U.S. Pat. No. 4,934,773, to Becker. Such cooperation with the other elements, as will be more fully discussed below, enables the filter 26 to produce an image having a resolution that appears to be in full-color to the human eye.

Figure 2:
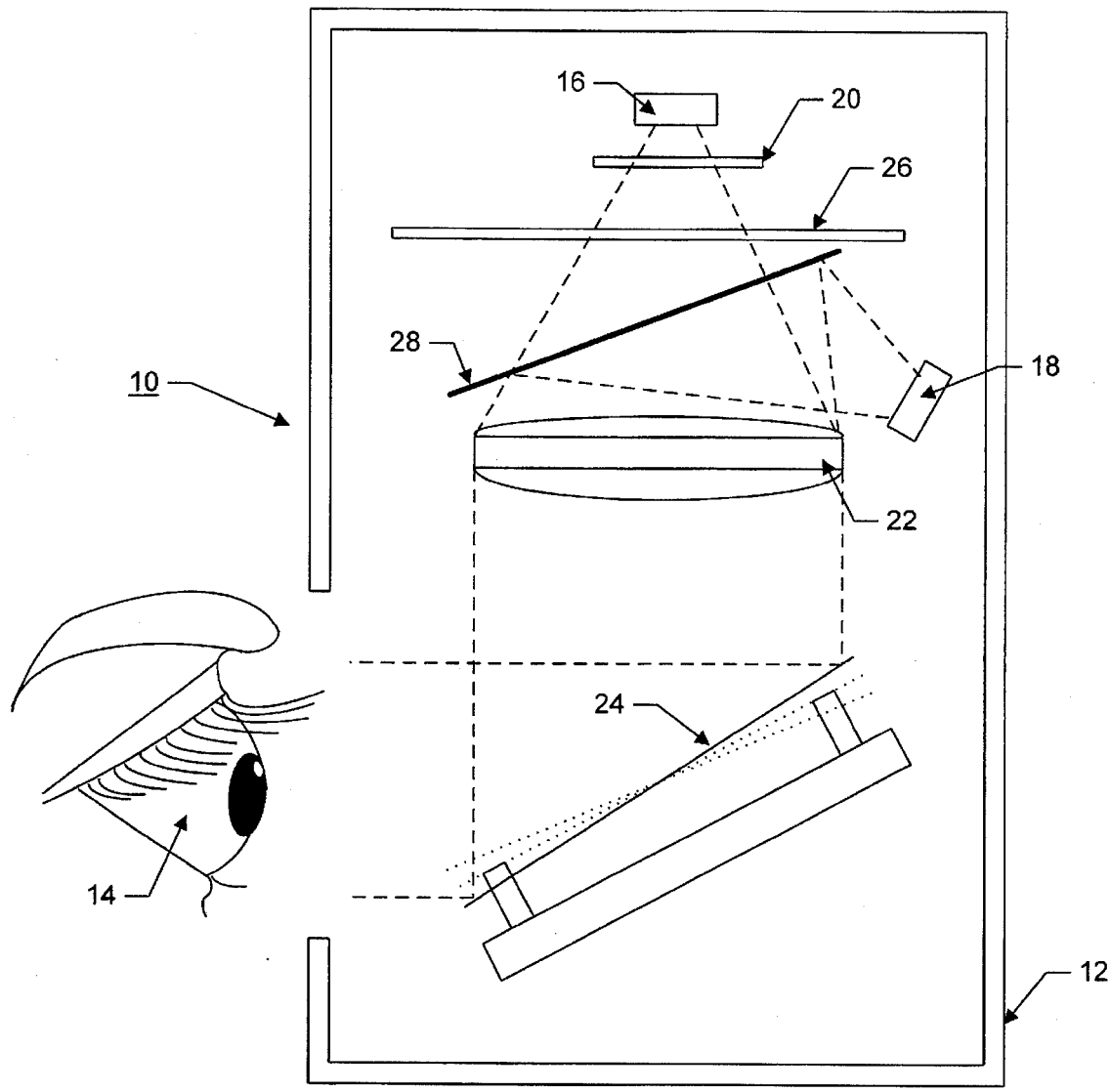
FIG. 2 is a schematic illustration of an alternate embodiment of the invention, where the light-emitting diode arrays are not adjacent to one another.

FIG. 2 shows an alternative embodiment where the arrays 16 and 18 are not positioned adjacent to one another. Specifically, the second array 18 is positioned so that the red light beam emitted from the second array 18 does not pass through the filter 26. A second mirror 28 is provided to substantially coincidentally align the light beam emitted from the second array 18 with the light beam emitted from the first array 16 as both beams pass through the lens 22. When the filter is controlled as discussed above, a full-color image is produced at the opening 14.

Figure 3:
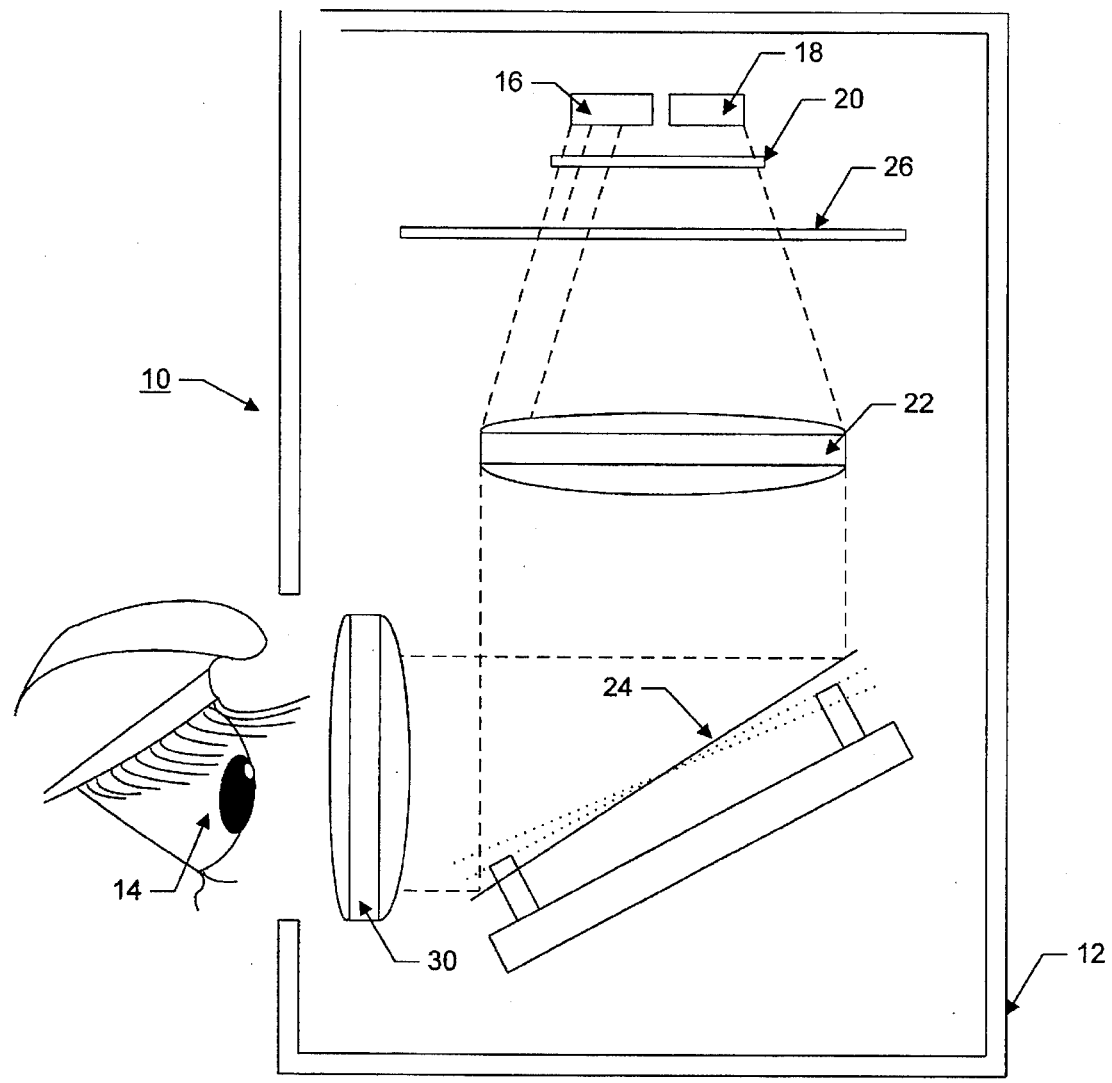
FIG. 3 is a schematic illustration of another alternate embodiment of the invention having a second imaging optics.

FIG. 3 shows another alternate embodiment where the reflected virtual image is passed through a second imaging optics, preferably an additional lens 30. The second lens 30 is selected and positioned so that it magnifies the virtual image produced by the oscillating mirror 24. Accordingly, the apparent size of mirror 24 is enlarged and mirror 24 in this embodiment can be smaller than the mirror used in the previous embodiments to produce the same field of view. The overall weight and size of the device is therefore reduced, as well as the angular momentum of the mirror 24 as it oscillates in response to the controlling hardware and software.

Figure 4A:
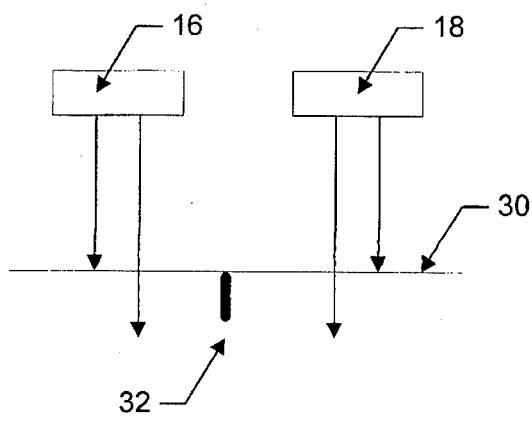
FIG. 4A is a schematic illustration of a side view of a color filter wheel.
Figure 4B:
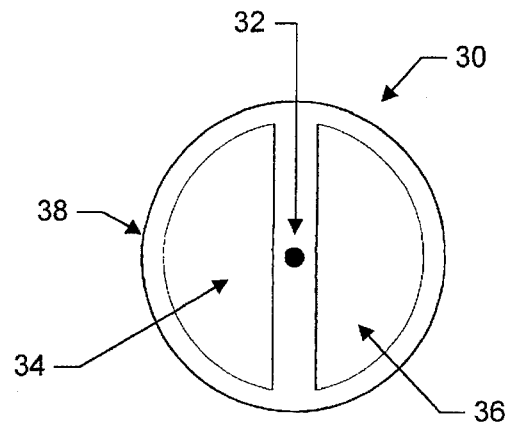
FIG. 4B is a schematic illustration of a bottom view of a color filter wheel.

Various filter designs can be used in the system 10 to yield a relatively high resolution, full-color image. One such design, which is well known in the art, is a color filter wheel. A color filter wheel is shown in FIGS. 4A and 4B which illustrates a portion of the system shown in FIGS. 1-3. Wheel 30 is a substantially disk-shaped, partially transparent member that is divided, for example, into two halves 34 and 36 (shown in FIG. 4B). A first half 34 of the disk 30 transmits all light wavelengths except for those in the green spectrum, while the other half 36 transmits all light wavelengths except for those in the blue spectrum. The wheel 30 is positioned so that the individual LEDs of the two arrays 16 and 18 are between the center of rotation 32 of the color filter wheel 30 and the outside edge 38 of the color filter wheel as shown in FIG. 4A. In response to controlling hardware and software, the disk 30 rotates around axis 32 thus alternately transmitting either blue light or green light in synchronism with the oscillation of mirror 24.

Figure 5:
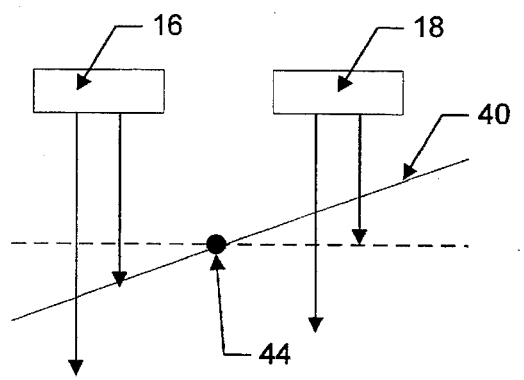
FIG. 5 is a schematic illustration of a shifting notch filter.

Alternatively, a pivoting notch filter may be utilized. A pivoting notch filter is a conventional filter whose transmission wavelength is dependent on the angle of incidence at which light strikes the filter. A filter which is suitable for use with the present invention has a notch rejection wavelength band that shifts in response to varying angles of incidence of light passing through it. FIG. 5 illustrates a portion of the illustrative embodiment including the two LED arrays 16 and 18 and the filter 40. The notch filter 40 pivots around pivot point 44. When the angle of incidence is 90 degrees (normal incidence) as illustrated by the dotted position 42 of filter 40, the notch filter is highly transmissive to all visible light except light having wavelengths of between 490 nm and 540 nm (green light). When the filter is pivoted to a second angle, so that the angle of incidence is, for example, 45 degrees as shown by the solid position of filter 40 in FIG. 5, the rejection band shifts by 50 nanometers, to approximately 440 nm to 490 nm (blue light).

Figure 6:
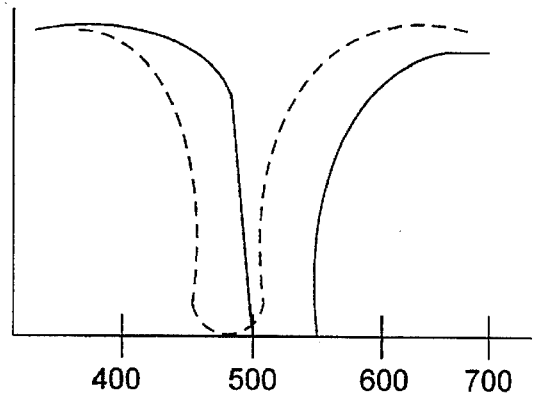
FIG. 6 is a graph that represents the shifting notch rejection wavelength band through a tilted notch filter.

FIG. 6 is a graphical representation of the shifting notch rejection wavelength band, where the solid line represents the normal incidence and the dashed line represents the 45 degree incidence. As with the color wheel appropriate hardware and software is used to coordinate the pivoting motion of the filter with the oscillations of the mirror 24.

A pi-cell filter may similarly be utilized, having the primary advantage of being generally smaller and having fewer moving parts. One pi-cell filter which is suitable for use with the present invention may be part number NU100S, manufactured and sold by NU Vision Technologies, Beaverton, Oreg. This latter filter is comprised of LCD material which can be electrically controlled to transmit light of selected wavelengths. The filter can be placed in position 26 illustrated in FIGS. 1-3 and electrically controlled by appropriate hardware and software to switch the filter LCD materials in synchronism with the oscillation of mirror 24.

The size of the individual LEDs and the arrays 16 and 18 depends upon the size of the box 12 and the optics therein. In a preferred embodiment, the individual LEDs are approximately 30-40 microns square, and both the arrays 16 and 18 are ten millimeters long by one millimeter wide. The preferred embodiment (shown in FIG. 1) has adjacent arrays 16 and 18 that are separated by 0.2 millimeters. The first array 16, which preferably emits light in the blue-green wavelength spectrum, may be fabricated from InGaN (Indium Gallium Nitride) having a peak emission between 480 nm and 490 nm. The second array 18, which preferably emits light in the red wavelength spectrum, may be fabricated from GaAsP (Gallium Arsenide Phosphide) having a peak emission between 650 nm and 665 nm. Other materials may be used, such as AlGaAs (Aluminum Gallium Arsenide) or AlInGaP (Aluminum Indium Gallium Phosphide). The first array 16 therefore emits light generally having wavelengths between 450 nm and 555 nm, while the second array 18 emits light generally having wavelengths between 620 nm and 700 nm.

Although the arrays 16 and 18 have been shown to be linearly aligned, other alignment arrangements may be equally suitable. For example, the LEDs may be in a staggered array, for example, in two or four offset rows. Each of the LEDs which correspond to a particular array, however, must emit light in substantially the same wavelength range.

The box 12 may either be a hand-held box which, for example, could be placed in the user's pocket or briefcase, or it could be a small box adapted to be mounted on glasses or goggles to free the user's hands. In the latter configuration, since the display is adjacent to only one eye of the user and could be positioned out of the user's main line of vision for that eye, it is possible for the user to monitor the display with minimal interruption of such user's normal vision. The display system 10 is thus adapted for use by pilots, machine operators, tank drivers, surgeons, or others who require many forms of data input while performing their normal functions. It may additionally provide information to the user in a form which tends to be less distracting than traditional information provision devices such as large arrays of dials, gauges, and monitors. The display system 10 could also be mounted so as to be movable to a position that is completely out of the user's line of vision when not in use.

Accordingly, a high resolution, full-color, miniature visual display is provided by the display system 10 that utilizes only two arrays 16 and 18. Indeed, such an arrangement reduces the overall size and complexity of the device while it also limits the manufacturing cost. In addition, since only two arrays 16 and 18 are used instead of three arrays, the potential for misalignment between colors due to chromatic aberrations in the various lenses within the system is reduced.

While the invention has been shown and described above with respect to various preferred embodiments, it will apparent that the foregoing and other changes of the form and detail may be made therein by one skilled in the art without departing from the spirit and scope of the invention.

We claim:

1. A miniature display system having a size suitable for hand-held and headgear-mounted use for displaying to a user's eye a full-color, two-dimensional image, the image being generated by selectively combining light having wavelengths within a first color wavelength range and light having wavelengths within a second color wavelength range, the display system comprising:

a first plurality of light-emitting elements aligned in a predetermined fashion, each of the light-emitting elements emitting light having wavelengths within the first color wavelength range;

a second plurality of light-emitting elements aligned in a predetermined fashion, each of the light-emitting elements emitting light having wavelengths within the second color wavelength range;

a mirror to reflect the light emitted by the first and second plurality of light-emitting elements to the users's eye;

a means for repetitively moving the mirror through a predetermined range of movement; and a means cooperating with the moving means for selectively illuminating the first plurality of light-emitting elements and the second plurality of light-emitting elements as the mirror moves; and a means cooperating with the moving means for filtering the light emitted from the first plurality of light-emitting elements so that light transmitted through the filtering means falls within a first part of the first color wavelength range during a first portion of the mirror movement and the light transmitted through the filtering means falls within a second part of the first color wavelength range during a second portion of the mirror movement.

2. The display system as defined in claim 1 wherein the light in the first color wavelength range consists of wavelengths between approximately 450 nm and 555 nm.

3. The display system as defined in claim 2 wherein the light emitted by the second plurality of light-emitting elements has wavelengths between approximately 620 nm to 700 nm.

4. The display system as defined in claim 1 wherein the filtering means comprises:

a color filter wheel having a first section which blocks light having wavelengths within the first part of the first color wavelength range and transmits all other wavelengths and a second section which blocks light having wavelengths within the second part of the first color wavelength range and transmits all other wavelengths; and a means responsive to mirror movement for selectively moving the color filter wheel.

5. The display system as defined in claim 1 wherein the filtering means comprises a pi-cell filter having alterable transmission characteristics and means responsive to mirror movement for altering the transmission characteristics.

6. The display system as defined in claim 1 wherein the filtering means comprises:

a pivoting notch filter having transmission characteristics dependent on an angle of incidence of incoming light; and a means responsive to mirror movement for selectively altering the angle of incidence of light emitted from the first and second plurality of light-emitting elements which falls on the pivoting notch filter.

7. The display system as defined in claim 6 wherein the pivoting notch filter has a transmission rejection wavelength of approximately 50 nanometers.

8. The display system as defined in claim 1 wherein the means for repetitively moving the mirror moves the mirror in a forward direction and in a reverse direction, and the filtering means transmits light from the first part of the first color wavelength range when the mirror is moving in the forward direction and transmits light from the second part of the first color wavelength range when the mirror is moving in the reverse direction.

9. The display system as defined in claim 1 further comprising a second mirror that transmits light emitted from the first plurality of light-emitting elements and reflects light emitted from the second plurality of light-emitting elements.

10. The display system as defined in claim 1 further comprising imaging optics positioned between the first and second plurality of light-emitting elements and the mirror for generating a magnified image of the first and second plurality of light-emitting elements.

11. The display system as defined in claim 1 wherein the first plurality of light-emitting elements are aligned in a first linear array and the second plurality of light-emitting elements are aligned in a second linear array.

12. The display system as defined in claim 11 wherein the first linear array and the second linear array lie substantially in the same plane.

13. The display system as defined in claim 11 wherein the first linear array and the second linear array lie in different planes.

14. The display system as defined in claim 1 wherein light emitted from the second plurality of light-emitting elements is substantially transmitted through the filtering means.

15. The display system as defined in claim 1 wherein the first plurality of light-emitting elements and the second plurality of light-emitting elements are light-emitting diodes.

16. A method for displaying to a user's eye a full-color, two-dimensional image using a miniature display system having a size suitable for hand-held and headgear-mounted use, the method comprising the steps of:

oscillating a mirror with a repetitive movement;

based on the movement of the mirror, selectively generating light having wavelengths within a first wavelength range;

filtering, based on the movement of the mirror, the selectively generated light having wavelengths within a first wavelength range so that light having wavelengths within a first part of the first wavelength range falls on the mirror during a first portion of the mirror movement and light having wavelengths within a second part of the first wavelength range falls on the mirror during a second portion of the mirror movement; and based on the movement of the mirror, selectively generating light having wavelengths within a second wavelength range and transmitting the light to the mirror, so that the light falling on the mirror combines to generate a full color image which is reflected to the user's eye.

17. The method as defined in claim 16 wherein the step of selectively generating light having wavelengths within a first wavelength range comprises the step of:

selectively generating light having wavelengths between approximately 450 nm and 555 nm.

18. The method as defined in claim 17 wherein the step of selectively generating light having wavelengths within a second wavelength range comprises the step of:

selectively generating light having wavelengths between approximately 620 nm and 700 nm.

19. The method as defined in claim 16 further comprising the additional step of:

reflecting the selectively generated light having wavelengths within a second wavelength range from a second mirror.

20. The method as defined in claim 16 further comprising the additional step of:

using an optical system to form an image from the filtered light and the selectivity generated light having wavelengths within a second wavelength range.

21. The method as defined in claim 16 wherein the step of filtering comprises the steps of:

passing the selectively generated light having wavelengths with a first wavelength range through a color filter wheel having a first section which blocks light having wavelengths within the first part of the first wavelength range and transmits all other wavelengths and a second section which blocks light having wavelengths within the second part of the first wavelength range and transmits all other wavelengths; and selectively moving the color filter wheel based on the minor movement to control the wavelengths of the light falling on the mirror.

22. The method as defined in claim 16 wherein the step of filtering comprises the steps of:

passing the selectively generated light having wavelengths in a first wavelength range through a pi-cell filter having alterable transmission characteristics; and altering the transmission characteristics based on the mirror movement.

23. The method as defined in claim 16 wherein the step of filtering comprises the steps of:

passing the selectively generated light having wavelengths within a first wavelength range through a pivoting notch filter having transmission characteristics dependent on an angle of incidence of incoming light; and selectively altering the angle of incidence of light emitted from the first and second plurality of light-emitting elements which fails on the pivoting notch filter based on the mirror movement.

24. The method as defined in claim 16 wherein the step of oscillating the mirror comprises the steps of:

moving the mirror in a forward direction and moving the mirror in a reverse direction; and wherein the step of filtering comprises the steps of:

transmitting light from the first part of the first wavelength range when the mirror is moving in the forward direction and transmitting light from second part of the first wavelength range when the mirror is moving in the reverse direction.

25. A miniature display system having a size suitable for hand-held and headgear-mounted use for displaying to a user's eye a full-color, two-dimensional image, the image being generated by selectively combining light having wavelengths within a first additive primary color wavelength range, light having wavelengths within a second additive primary color wavelength range and light having wavelengths within a third additive primary color wavelength range, the display system comprising:

a first linear array of light-emitting elements, each of the light-emitting elements being independently illuminable and emitting light having wavelengths within a first predetermined wavelength range encompassing wavelengths within the first and the second additive primary color wavelength ranges;

a second linear array of light-emitting elements, each of the light-emitting elements being independently illuminable and emitting light having wavelengths within the third additive primary color wavelength range;

a lens for generating an enlarged image of the first plurality of light-emitting elements and the second plurality of light-emitting elements;

a mirror to reflect the enlarged image to the users's eye;

a means for oscillating the mirror; and a means cooperating with the oscillating means for selectively illuminating the light-emitting elements in the first array and the light-emitting elements in the second array as the mirror moves to form a two-dimensional raster image; and a means located between the first array and the mirror and cooperating with the oscillating means for filtering the light emitted from the light-emitting elements in the first array so that light transmitted through the filtering means falls within the first additive primary color wavelength range during a first portion of the mirror movement and the light transmitted through the filtering means falls within the second additive primary color wavelength range during a second portion of the mirror movement.

26. The display system as defined in claim 25 wherein the filtering means comprises:

a color filter wheel having a first section which blocks light having wavelengths within the first additive primary color wavelength range and transmits all other wavelengths and a second section which blocks light having wavelengths within the second additive primary color wavelength range and transmits all other wavelengths; and a means responsive to mirror movement for selectively moving the color filter wheel.

27. The display system as defined in claim 25 wherein the filtering means comprises a pi-cell filter having alterable transmission characteristics and means responsive to mirror movement for altering the transmission characteristics.

28. The display system as defined in claim 25 wherein the filtering means comprises:

a pivoting notch filter having transmission characteristics dependent on an angle of incidence of incoming light; and a means responsive to mirror movement for selectively altering the angle of incidence of light emitted from the first and second plurality of light-emitting elements which falls on the pivoting notch filter.

* * * * *